(12) United States Patent
Zhang et al.

(10) Patent No.: US 11,402,293 B2
(45) Date of Patent: Aug. 2, 2022

(54) ELECTROSTATIC SELF-POWERED DISPLACEMENT GRID SENSOR

(71) Applicant: ZHEJIANG UNIVERSITY, Hangzhou (CN)

(72) Inventors: He Zhang, Hangzhou (CN); Huagang Wang, Hangzhou (CN); Zhicheng Zhang, Hangzhou (CN); Liwei Quan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 16/978,189

(22) PCT Filed: Jul. 25, 2019

(86) PCT No.: PCT/CN2019/097708
§ 371 (c)(1),
(2) Date: Sep. 4, 2020

(87) PCT Pub. No.: WO2020/093733
PCT Pub. Date: May 14, 2020

(65) Prior Publication Data
US 2021/0278311 A1    Sep. 9, 2021

(30) Foreign Application Priority Data

Nov. 5, 2018 (CN) .......................... 201811308112.8

(51) Int. Cl.
*G01M 5/00* (2006.01)
*G01B 7/004* (2006.01)
*G01B 7/02* (2006.01)

(52) U.S. Cl.
CPC ............. *G01M 5/0041* (2013.01); *G01B 7/02* (2013.01)

(58) Field of Classification Search
CPC ......... G01M 5/0041; G01B 7/02; G01B 7/16; G01D 5/2415; H02N 1/04
See application file for complete search history.

(56) References Cited

U.S. PATENT DOCUMENTS

| | | | |
|---|---|---|---|
| 9,385,302 B2 * | 7/2016 | Sato ...................... | H01L 41/083 |
| 2013/0170618 A1 | 7/2013 | Koehler et al. | |

FOREIGN PATENT DOCUMENTS

| | | |
|---|---|---|
| CN | 86106558 A | 3/1988 |
| CN | 2341119 Y | 9/1999 |
| | (Continued) | |

OTHER PUBLICATIONS

Machine translation of CN2831707 (Year: 2006).*
(Continued)

*Primary Examiner* — Patrick Assouad
*Assistant Examiner* — Sangkyung Lee
(74) *Attorney, Agent, or Firm* — W&G Law Group

(57) ABSTRACT

The present disclosure provides an electrostatic self-powered displacement grid sensor used for measuring the displacement of a component to be measured. The device structure includes a sliding chute and a sliding sheet, wherein the sliding chute is fixed to a fixed end, and the bottom of the inner side of the sliding chute is provided with a sensing array; the sliding sheet is fixedly connected with the component to be measured, and the lower end of the sliding plate is in contact with the bottom of the inner side of the sliding chute. When the sliding sheet slides over the sensing array; a corresponding electrical signal is produced, and the number of segments and the distance on sensing units on a single sensing array over which the sliding sheet slides can be obtained according to numbers and output current of sensing units in the sensing array indicated by the signal, and therefore the structural displacement is obtained. Compared with other displacement measurement devices, a (Continued)

segmented displacement meter has the advantages of simple structure, wide application range, high measurement precision and no additional power supply; moreover, the present disclosure creatively solves the problem of unstable results of calibrating displacement according to electrical signals.

8 Claims, 5 Drawing Sheets

(56) References Cited

FOREIGN PATENT DOCUMENTS

| | | | |
|---|---|---|---|
| CN | 2831707 Y | * | 10/2006 |
| CN | 102506718 A | | 6/2012 |
| CN | 103791927 A | | 5/2014 |
| CN | 206125516 U | | 4/2017 |
| CN | 108613623 A | | 10/2018 |
| CN | 109458922 A | | 3/2019 |
| CN | 109470133 A | | 3/2019 |
| EP | 0522377 A1 | | 1/1993 |
| JP | H06307802 A | | 11/1994 |

OTHER PUBLICATIONS

Machine translation of CN 108613623 (Year: 2020).*
International Search Report (PCT/CN2019/097708 ); dated Oct. 24, 2019.
Fisrt Office Action [2020-551342] dated Jun. 21, 2021.

* cited by examiner

ELECTROSTATIC SELF-POWERED DISPLACEMENT GRID SENSOR

TECHNICAL FIELD

The present disclosure relates to an electrostatic self-powered displacement grid sensor.

BACKGROUND

The failure of civil engineering structures under the action of strong earthquake, strong wind, traffic load and other vibration has caused serious social losses, so it is necessary to strengthen the displacement monitoring of a building structure vibration to ensure its safety and feasibility. A displacement test of a structure is a very important step for engineers to carry out a structural optimization design, understand the structural stress state and ensure structural safety. Displacement measuring instruments are widely used in displacement measurement of bridges, railways, dams and various building facilities. At present, the commonly used displacement measuring instruments mainly include dial indicators, resistance displacement meters, vibrating wire sensors and so on. However, some shortages exist for these devices and the application prospects are limited. In detail, the main disadvantage of the dial indicator is the limitation of the marking length and installation; the resistance displacement is limited in practical applications due to its non-linearity, weak output signals and poor anti-interference ability; the vibrating wire sensor is restricted by sensor materials, complex processing technology and low measurement accuracy.

SUMMARY

The technical problem to be solved by the present disclosure is to provide an electrostatic self-powered displacement grid sensor; which can be used for measuring structural displacement, can convert the deformation energy of a component to be measured into electric energy and output the electric energy in the form of electric signals, and has the characteristics of high precision, wide application range, easy processing and simple operation.

The technical solution adopted by the present disclosure to solve the technical problem is as follows: an electrostatic self-powered displacement grid sensor for measuring a displacement of a component to be measured, including a U-shaped sliding chute and a sliding sheet inserted at a notch of the sliding chute; wherein the sliding sheet is parallel to a bottom surface of the sliding chute; and a length of the sliding sheet is longer than that of the sliding chute; one end of the sliding sheet is used for attaching to the component to be measured; a sliding plate perpendicular to the sliding sheet is fixed on an inner side surface of the sliding sheet and perpendicular to a sliding direction of the sliding sheet; two ends of the sliding chute are provided with limit blocks extending outward for limiting the sliding plate, and the limit block at one end is used for attaching to another component to be measured; a sensing array consisting of a plurality of strip-shaped sensing units parallel to the sliding plate is arranged on an inner bottom surface of the sliding chute; a tail end of that sliding plate is also provided with a strip-shaped sensing unit; the plurality of sensing units in the sensing array and the sensing units at the tail end of the sliding plate each include a metal electrode layer and a dielectric material layer, and the dielectric material layer of the sensing unit in the sensing array and the dielectric material layer of the sensing unit at the tail end of the sliding plate are in contact with each other and have opposite polarities; the metal electrode layer at the tail end of the sliding plate is connected to an ammeter and then connected to a plurality of indicator lamps connected in parallel, wherein each of the plurality of indicator lamps is connected to the electrode layer of one sensing unit in the sensing array.

Further; the limit blocks and the sliding sheet are all fixed to the component to be measured by an adhesive.

Further, the component to be measured fixed to the sliding sheet and the component to be measured fixed to the limit block are respectively located at two sides of the sensor, and a relative displacement between the two components to be measured is measured.

Further, the indicator lamp and the ammeter are integrated on a back of the sliding chute.

Further, the sliding chute, the sliding sheet and the sliding plate each are made of an insulating material.

Further, each sensing unit in the sensing array has a same width, and a distance between two adjacent sensing units is the same as the width of the sensing unit; a thickness of the sliding sheet is the same as the width of the sensing unit.

Further; the two limit blocks have a same height that is larger than a thickness of a bottom plate of the sliding chute, and a width that is equal to a width of the bottom plate of the sliding chute.

Further; the sliding plate is fixed at two thirds of the sliding sheet.

Further, a displacement value at time t is calculated by the following formula: $\Delta x(t)=\Delta x_1(t)+\Delta x_2(t)$; where $\Delta x_1(t)$ represents a coarse displacement determined by the position of the indicator lamp, and $\Delta x_2(t)$ represents a fine displacement determined based on a current value;

$\Delta x_1(t)=(|k|-1)\times l_0$, where k represents a serial number of an illuminated indicator lamp, and $l_0$ represents the width of the sensing unit; and $\Delta x_2(t)=f(IR_k)$, where $R_k$ represents a resistance of a $k^{th}$ indicator lamp, I represents a current value, and f( ) represents a functional relationship between a displacement between two sensing units in contact with each other and an output voltage.

The present disclosure has the beneficial effects that: the mechanical law of a component during displacement can be converted into an electrical signal according to its force-electricity conversion characteristic, and the electrical signal passes through a signal processing device, so that the displacement can be expressed as electrical signals and output electrical signals through an output device. Compared with other displacement measuring devices, the electrostatic self-powered displacement grid sensor has the advantages of a simple structure, a wide application range, high measurement accuracy, no additional power supply, etc., and creatively solves the problem of unstable results of calibrating displacement according to electrical signals.

Reference signs in the figures: 1-sliding chute; 2-sliding sheet; 21-sliding plate; 3-limit block; $l_0$-a sum of the widths of a grid electrode and its adjacent segments on the sensor; $\Delta x(t)$-total displacement of components; $\Delta x_1(t)$-first displacement of the component; $\Delta x_2(t)$-second displacement of the component.

DESCRIPTION OF EMBODIMENTS

The specific technical solution of the present disclosure will be further described below with reference to the attached drawings.

Figure 1:
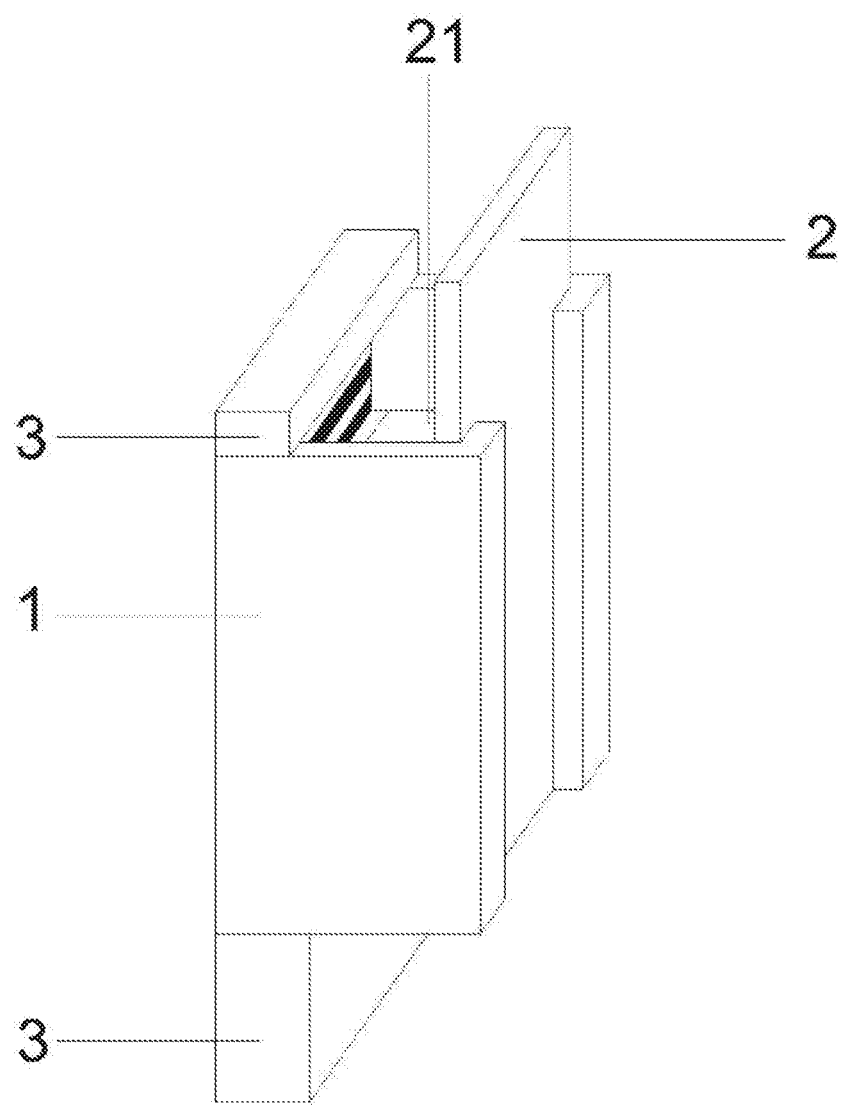
FIG. 1 is a structural diagram of an electrostatic self-powered displacement grid sensor.
Figure 5:
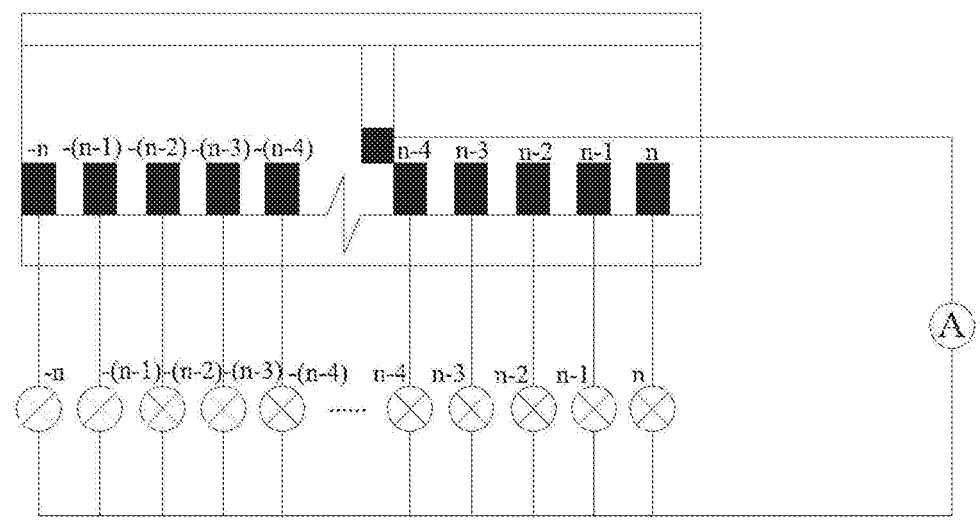
FIG. 5 is a circuit diagram of the displacement sensor shown in FIG. 1 for electrical signal measurement.

The present disclosure provides an electrostatic self-powered displacement grid sensor for measuring a displacement of a component to be measured, including a U-shaped sliding chute and a sliding sheet inserted at a notch of the sliding chute; wherein the sliding sheet is parallel to a bottom surface of the sliding chute, and the length of the sliding sheet is longer than that of the sliding chute; one end of the sliding sheet is used for attaching to the component to be measured; a sliding plate 21 sliding chute perpendicular to the sliding sheet is fixed on an inner side surface of the sliding sheet and perpendicular to the sliding direction of the sliding sheet; two ends of the sliding chute are provided with limit blocks extending outward for limiting the sliding plate 21 so as to prevent the sliding sheet 2 from sliding out of the sliding chute; meanwhile the limit block at one end is configure to be fixed to another component to be measured; a sensing array consisting of a plurality of strip-shaped sensing units parallel to the sliding plate 21 is arranged on an inner bottom surface of the sliding chute; the tail end of that sliding plate 21 is also provided with a strip-shaped sensing unit; the plurality of sensing units in the sensing array and the sensing unit at the tail end of the sliding plate are both composed of a metal electrode layer and a dielectric material layer, and the dielectric material layer of the sensing unit in the sensing array and the sensing unit at the tail end of the sliding plate are in contact with each other and have opposite polarities; the metal electrode layer at the tail end of the sliding plate 21 is connected to an ammeter and then connected to a plurality of indicator lamps connected in parallel, wherein each of the plurality of indicator lamps is connected to the electrode layer of one sensing unit in the sensing array, as shown in FIG. 1 and FIG. 5.

Figure 2:
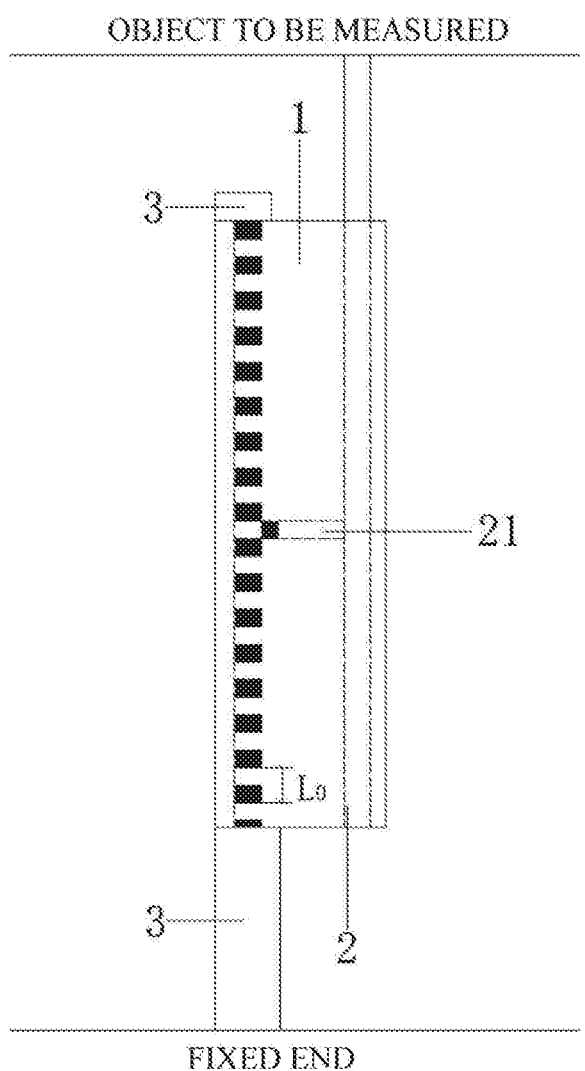
FIG. 2 is a schematic diagram of the installation of the displacement sensor shown in FIG. 1 on a component to be measured.

The installation form is shown in FIG. 2 (the sliding chute is fixed at the fixed end, and the sliding sheet is fixed at the component to be measured). The electric signal measuring device and related connecting wires are integrated at the bottom of the sliding chute. An adhesive can be used for connecting the sensor and the component, but it is not limited thereto.

As a preferred solution, the width of each sensing unit in the sensing array is the same, and the distance between two adjacent sensing units is the same as the width of the sensing unit. The thickness of the sliding plate 21 is the same as the width of the sensing unit, which is convenient for measurement.

The principle of realizing displacement measurement by the electrostatic self-powered displacement grid sensor of the present disclosure is as follows:

As shown in FIG. 5, each sensing unit on the sensing array in this structure is numbered symmetrically from the middle to two sides. The numbers are from No. 1 to No. n on the side far away from the longer limit block on the sliding chute; and the numbers are from No. −1 to No. −n on the side near the longer limit block on the sliding chute. Each sensing unit also has a corresponding indicator lamp, and the number of the indicator lamp is the same as that of the sensing unit. The sensing unit at the lower end of the sliding sheet is respectively connected with each sensing unit in sliding chute through wires to form indication circuits, and each indication circuit is independent of each other, connected in parallel, and provided with a corresponding indicator lamp. An ammeter is arranged in the general circuit of the detection circuit. When the sliding sheets slides over the $k^{th}$ sensing unit in the sliding chute, a certain potential difference will be generated. At this time, the sensing unit in the sliding chute and the sensing unit at the lower end of the sliding sheet can be regarded as an independent power supply, and the corresponding indicator lamp can be lit. It is known that the length of the sensing unit in the chute is $l_0$. When the e indicator lamp is on, the first displacement of the component can be obtained as $\Delta x_1(t)=(|k|) \times l_0$. When the indicator lamp with a negative number lights up, it means that the object to be measured is close to the fixed surface; when the indicator lamp with a positive number lights up, it means that the object to be measured is far away from the fixed surface.

As mentioned above, when the sliding sheet slides over the $k^{th}$ sensing unit in the sliding chute, it will also output one corresponding KO. Given that the resistance of each indicator lamp is R, the voltage $V(t)=R \times |I(t)|$ can be calculated: Furthermore, the second displacement $\Delta x_2(t)$ of the component can be obtained according to the relational expression of V(t) and x(t) obtained by following deduction.

Figure 3:
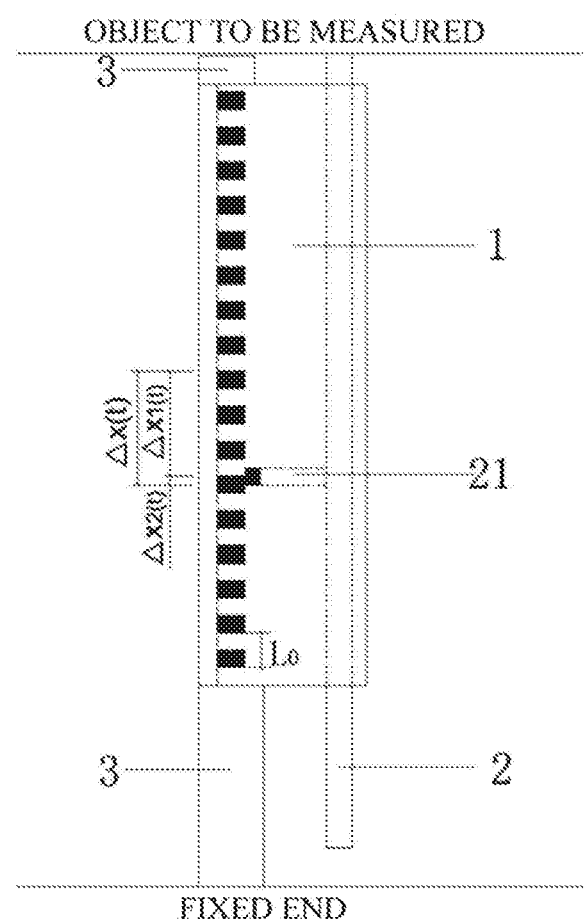
FIG. 3 is a measurement state when the object to be measured approaches a fixed surface in the installation schematic diagram shown in FIG. 2.

Taking the measurement state of the object to be measured approaches the fixed end (FIG. 3) as an example. At a certain time t, the compression amount of the component is x(t), that is, the relative displacement amount of the first electrode layer and the second electrode layer is x(t).

In the electrostatic self-powered displacement sensor, the thicknesses of two dielectric materials are d1 and d2 respectively, and their relative dielectric constants are $\varepsilon r_1$ and $\varepsilon r_2$ respectively. x(t) represents the relative displacement between the electrode plates coated with two dielectric materials, and x(t) changes from 0 to the maximum when the displacement sensor device works. When there is no relative displacement between two electrode plates coated with dielectric materials (i.e., x(t)=0), the electrode plates are charged, and the surfaces of the two electrode plates obtain opposite static charges with equal charge density σ (charge density caused by contact friction). And when the two electrode plates generate relative displacement, the electric charge generates a current through an external circuit. When the load resistance is given as R, the expression of charge Q is:

$$R \frac{dQ(t)}{dt} = -\frac{d_0 Q(t)}{w \varepsilon_0 (l - x(t))} \quad (1)$$

where, $d_0 = d_1/\varepsilon r_1 + d_2/\varepsilon r_2$ is the equivalent thickness of the dielectric material, l is the length of the electrode plate coated with the dielectric material, w is the width of the dielectric material on a single sensing unit, and ε0 is a vacuum dielectric constant.

Accordingly, the voltage can be expressed as:

$$V(t) = -\frac{d_0 Q(t)}{w \varepsilon_0} + \frac{d_0 \sigma x(t)}{\varepsilon_0 (l - x(t))} \quad (2)$$

By combining the equations (1a) and (2), it can be obtained that there is a mapping relationship between voltage V(t) and displacement x(t) at a certain time t, that is, the displacement at this moment can be obtained by measuring voltage V(t) at a certain time t, and the displacement can be expressed as an electrical signal by a measuring circuit.

Figure 4:
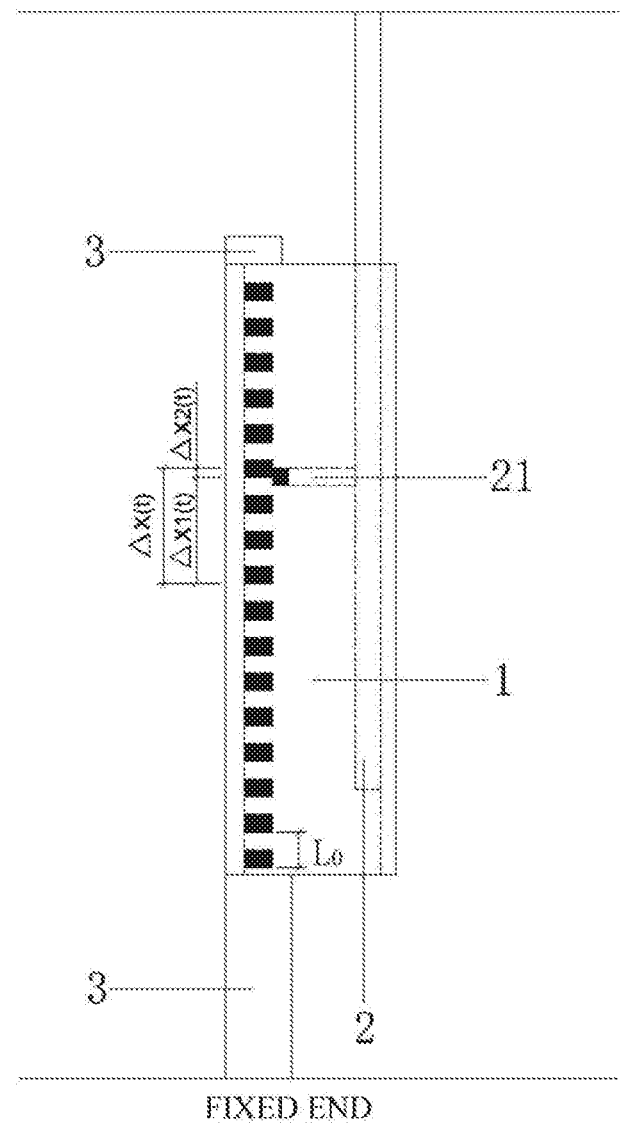
FIG. 4 is a measurement state when the object to be measured is far away from the fixed surface in the installation schematic diagram shown in FIG. 2.

The measuring state principle of the measured object far from the fixed end shown in FIG. 4 is the same as above.

At this time, the total displacement $\Delta x(t)=\Delta x_1(t)+\Delta x_2(t)$ can be obtained.

What is claimed is:

1. An electrostatic self-powered displacement grid sensor for measuring a displacement of a component to be measured, comprising a U-shaped sliding chute (1) and a sliding sheet (2) inserted at a notch of the sliding chute (1); wherein the sliding sheet (2) is parallel to a bottom surface of the sliding chute (1), and a length of the sliding sheet is longer than ta length of the sliding chute; one end of the sliding sheet is used for attaching to the component to be measured; a sliding plate (21) perpendicular to the sliding sheet (2) is fixed on an inner side surface of the sliding sheet (2) and perpendicular to a sliding direction of the sliding sheet; two ends of the sliding chute (1) are provided with limit blocks (3) extending outward for limiting the sliding plate (21), and the limit block at one end is used for fixing another component to be measured; a sensing array consisting of a plurality of strip-shaped sensing units parallel to the sliding plate (21) is provided on an inner bottom surface of the sliding chute (1); a tail end of the sliding plate (21) is also provided with a strip-shaped sensing unit; the sensing units in the sensing array and the sensing unit at the tail end of the sliding plate are both composed of a metal electrode layer and a dielectric material layer, and the dielectric material layer of the sensing unit in the sensing array and the dielectric material layer of the sensing unit at the tail end of the sliding plate are in contact with each other and have opposite polarities; the metal electrode layer at the tail end of the sliding plate (21) is connected to an ammeter and then connected to a plurality of indicator lamps connected in parallel, wherein each of the plurality of indicator lamps is connected to the electrode layer of one sensing unit in the sensing array;

wherein in the sensing array, each sensing unit has a same width, and a distance between two adjacent sensing units is the same as the width of the sensing unit; and a thickness of the sliding sheet (21) is the same as the width of the sensing unit.

2. The sensor according to claim 1, wherein the limit blocks (3) and the sliding sheet are all fixed to the component to be measured by an adhesive.

3. The sensor according to claim 1, wherein the component to be measured fixed to the sliding sheet and the component to be measured fixed to the limit block (3) are respectively located at two sides of the sensor, and a relative displacement between the two components to be measured is measured.

4. The sensor according to claim 1, wherein the plurality of indicator lamps and the ammeter are integrated on a back of the sliding chute.

5. The sensor according to claim 1, wherein the sliding chute (1), the sliding sheet (2) and the sliding plate (21) each are made of an insulating material.

6. The sensor according to claim 1, wherein the two limit blocks (5) have a same height that is larger than a thickness of a bottom plate of the sliding chute, and a width that is equal to a width of the bottom plate of the sliding chute.

7. The sensor according to claim 1, wherein the sliding plate (21) is fixed at two thirds of the sliding sheet (2).

8. The sensor according to claim 1, wherein a displacement value at time t is calculated by the following formula: $\Delta x(t)=\Delta x_1(t)+\Delta x_2(t)$; where $\Delta x_1(t)$ represents a coarse displacement determined by the position of the indicator lamp, and $\Delta x_2(t)$ represents a fine displacement determined based on a current value; and $\Delta x_1(t)=(|k|-1)\times l_0$, where k represents a serial number of an illuminated indicator lamp, and $l_0$ represents the width of the sensing unit; and $\Delta x_2(t)=f(IR_k)$, where $R_k$ represents a resistance of a $k^{th}$ indicator lamp, I represents a current value, and f( ) represents a functional relationship between a displacement between two sensing units in contact with each other and an output voltage.

* * * * *